VARIABLE DURATION PULSE INTEGRATOR

Filed Oct. 9, 1964 3 Sheets-Sheet 1

INVENTOR
ARTHUR L. NEWCOMB, JR.
BY
William H. King
ATTORNEYS

INVENTOR
ARTHUR L. NEWCOMB, JR.

BY

ATTORNEYS

INVENTOR
ARTHUR L. NEWCOMB, JR.
BY
William H. King
ATTORNEYS

United States Patent Office 3,366,894
Patented Jan. 30, 1968

3,366,894

VARIABLE DURATION PULSE INTEGRATOR

Arthur L. Newcomb, Jr., Newport News, Va., assignor to the United States of America as represented by the Administrator of the National Aeronautics and Space Administration Filed Oct. 9, 1964, Ser. No. 402,978
4 Claims. (Cl. 332—1)

ABSTRACT OF THE DISCLOSURE

The variable duration pulse integrator receives an incoming pulse whose duration through appropriate circuitry is changed. An incoming pulse is also integrated and this pulse and the duration pulse are both applied to a limiter which limits the amplitude of an output fed to a first emitter follower and integrator and then to a second emitter follower to an output terminal. The pulse however before reaching the output terminal is fed back through an amplifier to the input of the second emitter follower. This circuitry smooths out of limits the ripple content of the DC output voltage.

The invention described herein may be manufactured and used by or for the Government of the United States of America for governmental purposes without the payment of any royalties thereon or therefor.

The invention relates generally to an integrating means and more particularly to means for integrating a group of pulse duration modulated (PDM) pulses.

A major disadvantage of conventional methods of integrating PDM pulses is the high ripple content of the output due to the high ripple content of the pulses. This is primarily due to the fact that ripple content of a pulse is an inverse function of pulse duration. That is, where the pulse duration decreases, the ripple content increases. The ripple content of the pulses could be removed by filtering networks using capacitors and inductors. However, such a solution would be inadequate since these filtering components would cause the response of the circuit to the varying input pulse durations to become too slow.

The present invention provides a means for integrating PDM pulses that will eliminate most of the ripple content of the pulses and at the same time maintain a fast response to the pulses. To accomplish this result the present invention consists of means for converting the PDM pulses into pulse amplitude modulated (PAM) pulses and then integrating the PAM pulses with an RC integrating circuit and feedback network to obtain a DC output. The PDM pulses are converted to PAM pulses by generating constant duration pulses and limiting their amplitudes proportional to the durations of the PAM pulses.

The present invention has been used to convert the output of a horizon scanner, for use on satellites, to make it compatible with an attitude control system. Two of the circuits which constitute this invention were connected back-to-back in an adder arrangement to provide a DC output whose polarity corresponded to that of the input pulses.

It is, therefore, an object of this invention to provide a means for integrating PDM pulses that will eliminate the ripple content of the pulses.

It is another object of this invention to provide a means for integrating PDM pulses and maintain a fast response to the pulses.

A further object of this invention is to provide a means for converting PDM pulses into PAM pulses.

Other objects and advantages of this invention will further become apparent hereinafter and in the drawings, in which.

Figure 1:
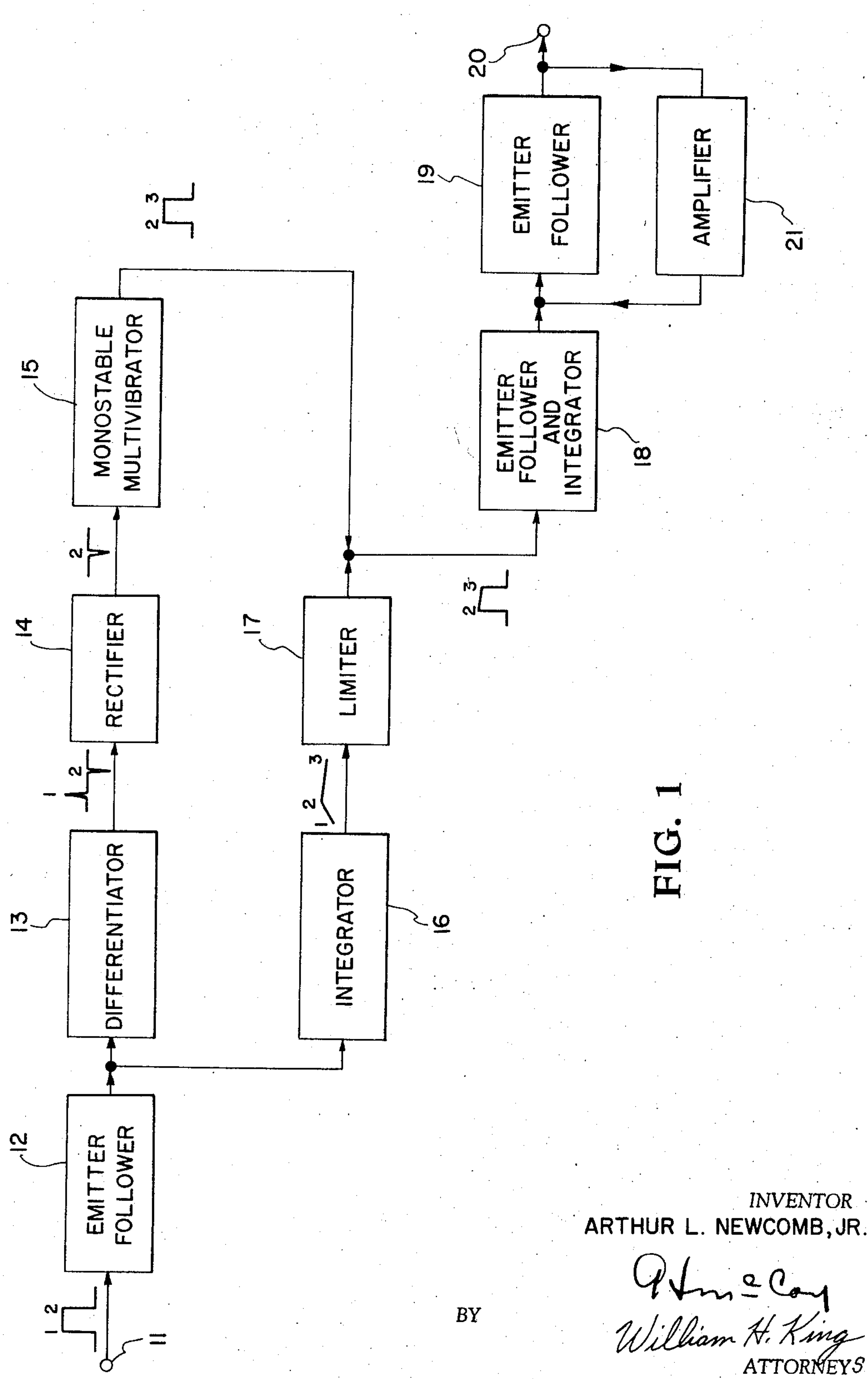
FIG. 1 is a block diagram of the invention.

In describing the preferred embodiment of the invention illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose.

Turning now to the specific embodiment of the invention selected for illustration in the drawings, the number 11 in FIG. 1 is the input terminal. The PDM pulses that are to be integrated are applied to terminal 11. For the purpose of explanation one of the pulses applied to terminal 11, starting at time 1 and ending at a time 2, will be traced through the block diagram in FIG. 1. The purpose of emitter follower 12 is to match the high impedance of the source of PDM pulses to the lower impedance of the circuitry that integrates the PDM pulses. The pulse at the output of emitter follower 12 is applied to a differentiator 13 which generates two sharp pulses: a sharp positive pulse at time 1 and a sharp negative pulse at time 2. These two pulses are applied to a rectifier 14 which eliminates the sharp positive pulse at time 1. The remaining sharp negative pulse at time 2 is then applied to a monostable multivibrator 15 to generate a pulse starting at time 2 and ending at a time 3. This generated pulse is added to the voltage of limiter 17 in a manner to be described more fully hereinafter. All pulses generated by monostable multivibrator 15 have the same duration.

The pulse at the output of emitter follower 12, in addition to being applied to differentiator 13, is also applied to an integrator 16. Integrator 16 produces an output voltage which increases between times 1 and 2 and remains substantially constant between the times 2 and 3. This output from integrator 16 is applied to limiter 17 which limits the amplitude of the pulse generated by monostable multivibrator 15 to the amplitude of the output from integrator 16 between the times 2 and 3. This limited pulse is then applied to an emitter follower and integrator 18 to produce an integrated output. This integrated output is applied through an emitter follower 19 to an output terminal 20. The output at terminal 20 is fed back through a negative amplifier 21 to the input of emitter follower 19 to further smooth out or limit the ripple content of the DC voltage appearing at the output of integrator 18.

Figure 2:
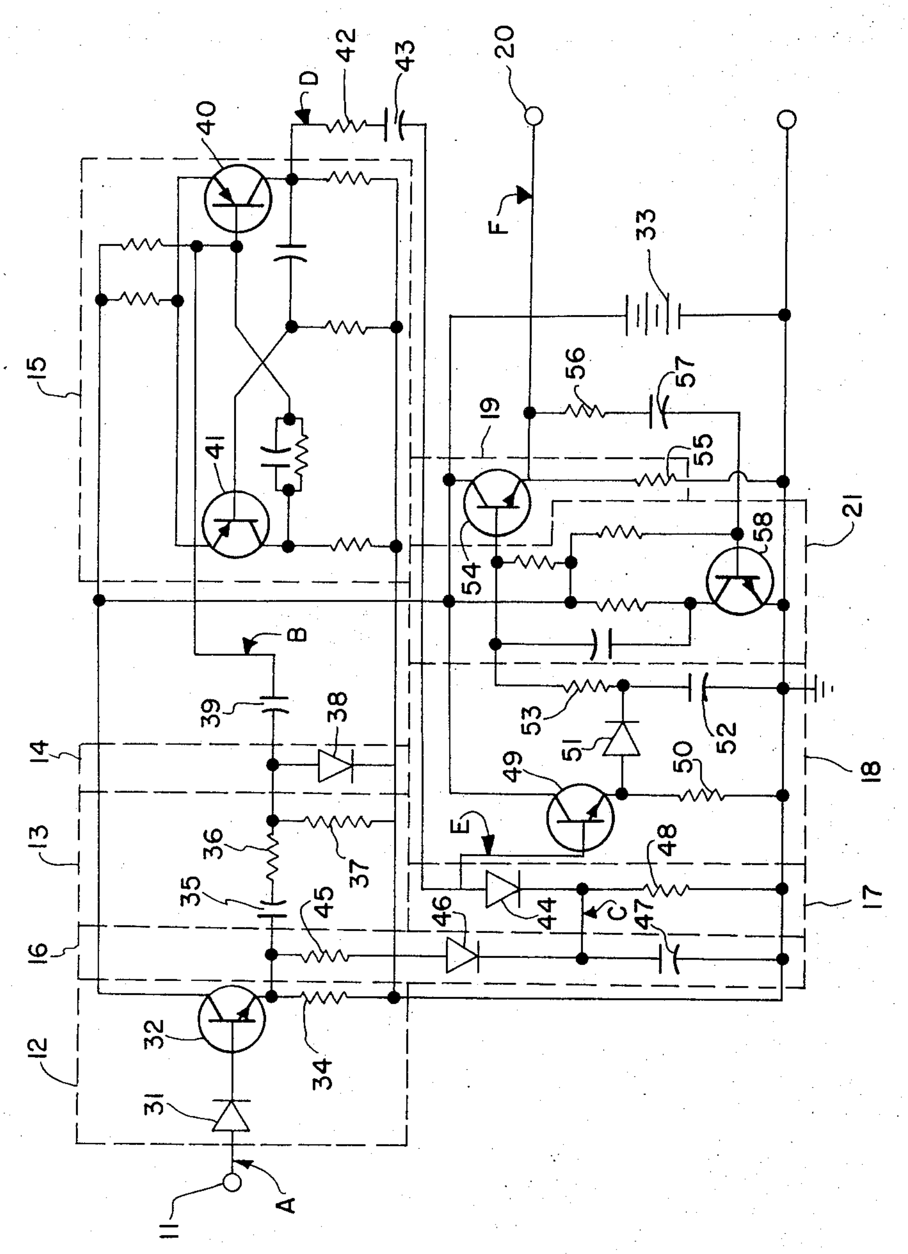
FIG. 2 is a schematic diagram of the invention.

Referring now to FIG. 2 there is shown a schematic diagram of the invention in which the dotted blocks correspond to the blocks in the block diagram of FIG. 1. The PDM pulses applied to terminal 11 are applied through a diode 31 to the base of an NPN transistor 32. The collector of transistor 32 is connected to the positive side of a voltage source 33 and the emitter of transistor 32 is connected through a resistor 34 to ground. The pulses appearing at the emitter of transistor 32 are applied to a differentiator consisting of a capacitor 35 and resistors 36 and 37. This differentiator produces a sharp positive pulse and a sharp negative pulse for each pulse applied to it. The sharp positive pulses pass to ground through diode 38 leaving only the sharp negative pulses. These sharp negative pulses are applied through a coupling capacitor 39 to a monostable multivibrator consisting of PNP transistors 40 and 41 and their associated circuitry. The monostable multivibrator circuitry appearing inside dotted box 15 is well known circuitry and therefore will not be described in detail in this specification. Monostable multivibrator 15 generates a pulse each time a sharp negative pulse is applied to it. These pulses all have the same duration, and are applied through resistor 42 and capacitor 43 to the anode of a diode 44.

The pulses at the emitter of transistor 32, in addition to being applied to differentiator 13, are applied to an integrator consisting of resistor 45, diode 46 and capacitor 47. For each pulse integrated a voltage appears across capacitor 47 that is proportional to the duration of that integrated pulse. A resistor 48 is connected across capacitor 47 to provide a discharge path for capacitor 47. The voltage appearing across capacitor 47 is applied to the cathode of diode 44. As can be seen, the voltage appearing across capacitor 47 creates a bias for diode 44, consequently, the pulses produced by monostable multivibrator 15 are applied to the anode of diode 44 will be limited to an amplitude equal to the voltage appearing across capacitor 47. These limited pulses are applied to the base of an NPN transistor 49, The collector of transistor 49 is connected to the positive side of voltage source 33 and the emitter of transistor 49 is connected through a resistor 50 to ground. The pulses appearing at the emitter of transistor 49 are applied through a diode 51 to a capacitor 52 where they are integrated. These integrated pulses are applied through a resistor 53 to an emitter follower consisting of an NPN transistor 54 and a resistor 55. The output of the emitter follower is connected to the output terminal 20. The output of the emitter follower is also applied back through a resistor 56 and a capacitor 57 to an amplifier consisting of an NPN transistor 58 and its associated circuitry. The output of the amplifier is applied back to the input of the emitter follower circuit. The amplifier is of a type that is well known in the art and will therefore not be described in detail in this specification.

Figure 3:
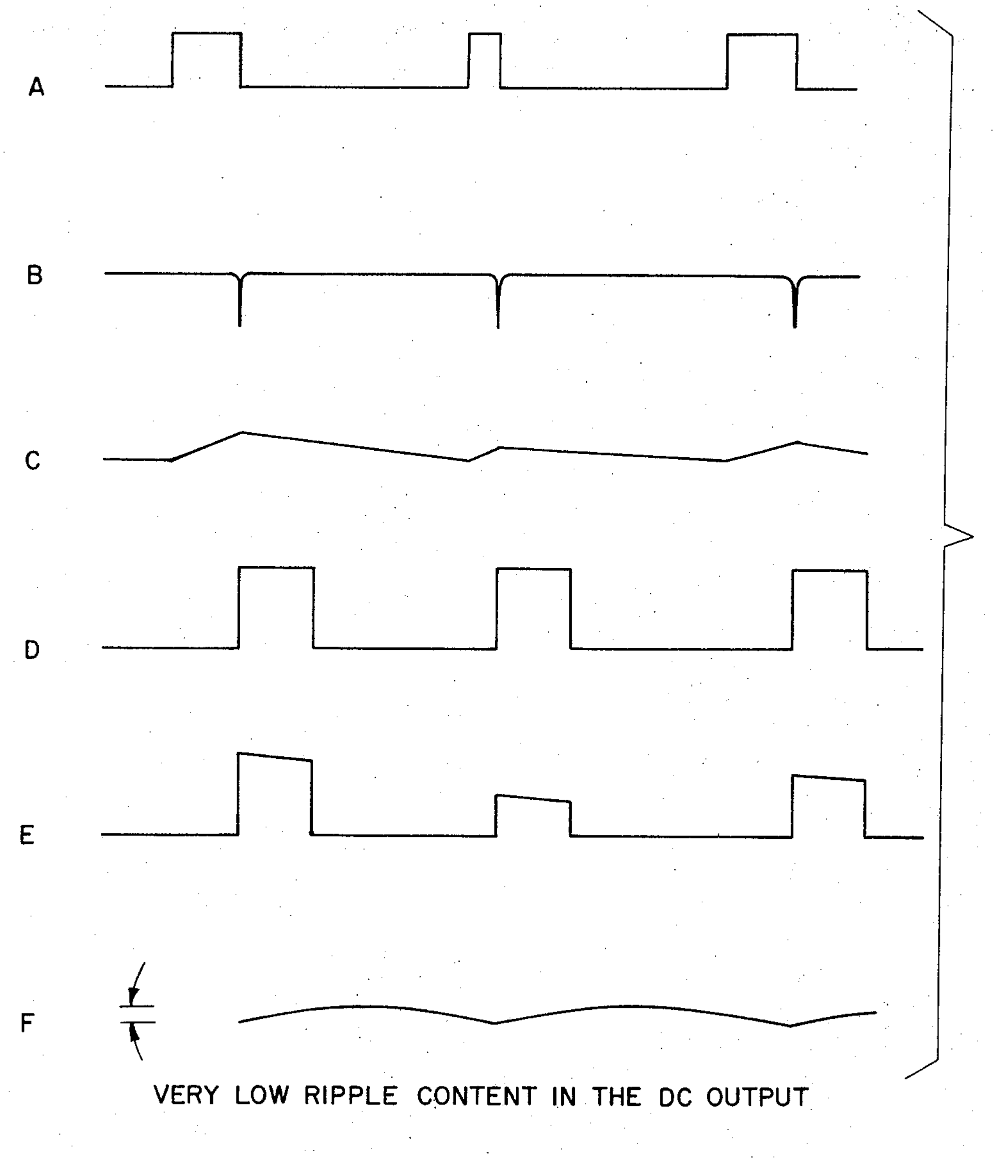
FIG. 3 is a diagram showing the different waveforms appearing in the schematic diagram of FIG. 2.

In describing the operation of the schematic diagram in FIG. 2, the waveforms shown in FIG. 3 will be referred to. The pulses at point A are the output PDM pulses applied to input terminal 11. As can be seen in FIG. 3 these pulses at point A all have the same amplitude but have different durations. For each input pulse at point A there appears at point B in FIG. 2 a negative sharp pulse at a time corresponding to the termination of the pulse at point A. At point C in the circuit in FIG. 2, there appears a voltage at the termination of each pulse at point A that has an amplitude proportional to the duration of the pulse at point A. At point D in the circuit, there is a pulse that begins at the same time as each of the sharp negative pulses at point B with each of these pulses at point D having the same duration. Since the voltage at point C acts as a limiting voltage for the pulses at point D all the pulses at point D are limited to the amplitudes of the voltage appearing at point C, thus, creating pulses at point E having the same durations but having amplitudes proportional to the voltages at point C. Consequently, the pulses at point E are pulse amplitude modulated in the same manner that the pulses at point A are pulse duration modulated. The pulses at point E are integrated and then applied to the emitter follower circuit 19 with the feedback amplifier 21 to produce an output at terminal 20. The DC voltage appearing at output terminal 20, corresponding to point F in the circuit, will have an output ripple of less than one percent of the output DC voltage.

The primary advantage of this integrating circuit is that it will produce a DC output which has a very low ripple content.

It is to be understood that the form of the invention herein shown and described is to be taken as a preferred embodiment. Various changes may be made in the shape, size, and arrangement of parts. For example, equivalent elements, such as integrators, differentiators, rectifiers, monostable multivibrators and limiters, may be substituted for those illustrated and described herein, parts may be reversed and certain features of the invention may be utilized independently of the use of other features, all without departing from the spirit or scope of the invention as defined in the following claims.

What is claimed is:

1. A converter for converting input pulse duration modulated pulses into ampltiude modulated pulses comprising: means for generating a triggering pulse each time an input pulse is received; a monostable multivibrator for generating a pulse of predetermined duration each time a triggering pulse is received; an integrator for integrating said input pulses; and a limiter connected between said integrator and said monostable multivibrator for limiting the amplitudes of the pulses generated by said monostable multivibrator proportional to the durations of said input pulses whereby said limited pulses are amplitude modulated with the same modulating signal as the input pulses.

2. An integrator in accordance with claim 1 wherein said limiter includes a diode connected between the outputs of said integrator and said means for generating a pulse each time a pulse is received.

3. An integrator for integrating a group of pulses which vary in duration in accordance with a modulating signal comprising: means receiving said group of pulses for generating a pulse each time a pulse is received with each generated pulse having the same duration; means for limiting the amplitudes of said generated pulses proportional to the amplitudes of the pulses in said group of pulses; means for integrating said limited pulses; and an emitter follower with an amplifier feedback circuit connected to the output of said integrating means whereby the output from said emitter follower provides an integration of said group of pulses that has a low-ripple content.

4. A converter for converting input pulse duration modulated pulses into amplitude modulated pulses comprising: a differentiator connected to receive said input pulses for producing a sharp positive pulse at the beginning of each received pulse and a sharp negative pulse at the termination of each received pulse; a rectifier for eliminating said sharp positive pulses; a monostable multivibrator connected to receive said sharp negative pulses for generating a pulse of predetermined duration each time a sharp negative pulse is received; an integrator for integrating said input pulses; and a limiter connected between said integrator and said monostable multivibrator for limiting the amplitudes of the pulses generated by said monostable multivibrator proportional to the durations of said input pulses whereby said limited pulses are amplitude modulated with the same modulating signal as the input pulses.

References Cited

UNITED STATES PATENTS

| | | | |
|---|---|---|---|
| 2,416,305 | 2/1947 | Greig | 332—1 X |
| 2,499,844 | 3/1950 | Boothroyd | 332—9 X |
| 2,508,672 | 5/1950 | Guanella et al. | 332—1 |
| 2,510,983 | 6/1950 | Krause | 332—1 |
| 3,183,448 | 5/1965 | Strother et al. | 332—1 X |
| 3,177,431 | 4/1965 | Ashley | 325—65 X |

ALFRED L. BRODY, *Primary Examiner.*